United States Patent [19]  [11] 4,073,962
Spata et al.  [45] Feb. 14, 1978

[54] PROCESS FOR THE PRODUCTION OF A PROTEIN PRODUCT

[75] Inventors: James M. Spata, St. Louis, Mo.; Roger L. Diel, Dupo, Ill.

[73] Assignee: Ralston Purina Company, St. Louis, Mo.

[21] Appl. No.: 691,654

[22] Filed: June 1, 1976

[51] Int. Cl.² .............................................. A23J 3/00
[52] U.S. Cl. .................................... 426/646; 426/515; 426/524; 426/656; 426/657; 426/802; 426/641
[58] Field of Search ............... 426/104, 646, 656, 657, 426/513, 515, 802, 641, 524

[56] References Cited

U.S. PATENT DOCUMENTS

| 3,480,987 | 3/1976 | Kim et al. | 426/802 X |
| 3,498,793 | 3/1970 | Page et al. | 426/657 X |
| 3,615,686 | 10/1971 | Marshall | 426/646 X |
| 3,870,808 | 3/1975 | Boyer et al. | 426/802 X |
| 3,920,853 | 11/1975 | Middendorf et al. | 426/104 |

Primary Examiner—Raymond N. Jones
Assistant Examiner—Esther M. Kepplinger
Attorney, Agent, or Firm—Virgil B. Hill

[57] ABSTRACT

A method of preparing a protein food product having an arrangement of helically aligned protein layers is disclosed wherein an aqueous slurry of a proteinaceous material is frozen by conveying said slurry through an extruder equipped to provide a freezing zone in order to form ice crystal layers in said slurry which mold the protein material of the slurry into striated layers arranged in the form of a helix. The frozen extruded product is then heat set at a temperature sufficiently high to allow the protein layers to heat set and melt the ice crystal layers to form a protein food product. The resultant product has an improved degree of toughness because of "cross structuring" of the protein layers which is an inherent effect of the helix arrangement of the protein layers in the product.

8 Claims, 2 Drawing Figures

PROCESS FOR THE PRODUCTION OF A PROTEIN PRODUCT

BACKGROUND OF THE INVENTION

This invention relates to protein food products and more particularly to a method of forming structured protein food products from vegetable and/or animal protein substances.

A highly desirable goal in food processing has been to employ less desirable food materials which are highly nutritious, yet inexpensive, and processing these to result in highly appealing food products. Particular efforts have been directed towards the production of simulated meat products from vegetable and/or animal protein substances. Various degrees of success have been achieved by a variety of processes as is illustrated, for example, by U.S. Pat. No. 2,682,466 to Boyer involving spun filaments and U.S. Pat. Nos. 3,496,858 to Jenkins and 3,940,495 to Flier involving extrusion of vegetable protein materials under conditions of elevated temperature and pressure into a zone of lower pressure to thereby expand the resultant material and produce an expanded textured protein food product which is simulative of a real piece of meat when hydrated.

U.S. Pat. No. 3,920,853 discloses a process for the formation of structured protein food products wherein an aqueous slurry of protein material is frozen into ice crystal layers spaced apart by intermediate layers of slurried protein particles created by formation of the ice crystal layers. Freezing of the slurry causes all of the ice crystal layers to extend in a generally normalized direction to the area or part of the slurry which is contacted with a refrigerating medium. The ice layers cumulatively comprise an in situ matrix which spaces, molds, and compresses the protein layers in striated fashion. Following freezing of the slurry, the next process step is to remove the ice layers and fix the remaining protein layers into a striated arrangement which resembles actual muscle tissue. This is carried out by heating of the frozen slurry at a temperature sufficiently high to fix the protein layers and convert them to a substantially insoluble form while the slurry is in a frozen state. This results in removal of the ice crystal layers and provides protein layers arranged in striated fashion with lines of cleavage generally arranged in the same direction. This novel food product bears a close resemblance to meat as a result of this arrangement of striated protein layers.

The present invention provides a continuous process for the production of a protein food product by the use of an extruder to create a freezing zone to form ice crystal layers of the slurry which cumulatively mold the protein layers in corresponding fashion and provide a protein food product. The unique aspect of this process is achieved by conveyance of the slurry through the extruder with a screw in which the flights of the screw are arranged in helical fashion around the axis thereof. Conveyance of the slurry through the extruder to freeze the same forms an arrangement of helically aligned ice crystal layers in the product which in turn forms the protein material of the slurry into layers in the form of a helix. The resultant structured protein food product having an arrangement of helically aligned protein layers provides the additional advantage of being somewhat tough because the helical arrangement of protein layers permits a cross structuring of the protein layers in a manner such that the toughness of the product is substantially improved. The instant process, furthermore, provides a means of producing a product pursuant to the present invention on a continuous basis.

SUMMARY OF THE INVENTION

The present invention comprises a method of preparing a protein food product having an arrangement of helically aligned protein layers comprising freezing an aqueous slurry of a protein material by conveying said slurry through a freezing zone to form ice crystal layers which mold the protein material of the slurry into layers in the form of a helix. Conveyance of the slurry in the above described manner is carried out by passing said slurry through an extruder or similar device which is equipped to freeze the slurry and form ice crystal layers therein in a helical arrangement which molds the protein layers in corresponding fashion. This provides a protein food product when heat set, of unusual toughness because of a cross structuring of the ice crystal layers and consequently the protein layers in the form of a helix. Following freezing of the slurry in the noted manner to form an arrangement of helically aligned ice crystal and protein layers, the product is heat set into a substantially insoluble form by heating the frozen slurry to a temperature sufficiently high to allow the protein layers to set and lower than a temperature of which they will degrade thereby forming the protein food product.

Alignment of the protein layers in the form of a helix produces an unusual structured protein food product of improved strength and toughness.

DESCRIPTION OF THE PREFERRED EMBODIMENTS

Figure 1:
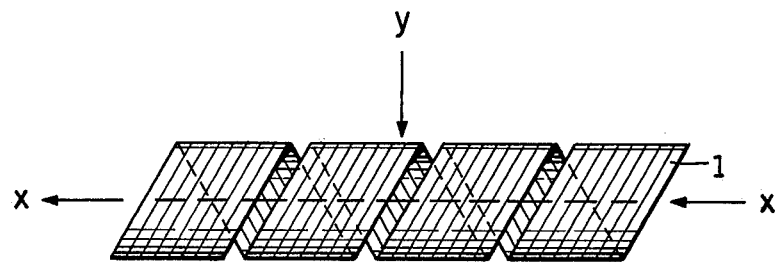
FIG. 1 generally illustrates a cross sectional view of the product produced pursuant to the present invention illustrating the helical arrangement of protein layers.

This invention may be practiced with either a vegetable or animal protein as the starting material or a combination thereof. Particular protein starting materials should be capable of being "heat set" as set forth in the present invention e.g. heating to a temperature above 150° F. while the ice layers serve as a mold for the protein to convert the protein into a firm, substantially insoluble form. Particular protein sources capable of being heat set within the scope of the present invention may be readily determined by one skilled in the art of employing the process set out herein.

An animal protein material, for example, may be used as the starting material and may include generally various types of animal protein sources, i.e., red meat, fowl, fish and other seafoods. One of the most significant advantages of the present invention is that a particular protein source is not critical to its practice. Rather, any type of heat settable protein material, e.g., natural meat or secondary protein source material, including those which are considered to be of a less desirable quality and not as desirable for human consumption may be employed. This allows the use of economical meat by-products to produce the striated, protein food product of the present invention which in texture resembles closely, various highly desired foodstuffs to include preferred meat types. If an animal protein source is employed, it can be used in its native form without additional processing other than removal of bones or other inedible portions of the protein source.

In utilizing the protein source in the present process, it is first reduced to particulate form in a suitable grinder or food chopper. An exact degree of grinding is unnecessary, although generally it is that which is necessary to masticate or grind the protein source to a paste of uniform consistency, so that it may be easily slurried prior to processing. Various natural meat or animal protein sources such as chicken, or other types of fowl, chicken by-products, pork by-products, beef products, such as beef muscle, beef trimmings, beef liver, beef by-products, fish muscle, or fish trimmings may be selectively combined or used singularly depending on the desired flavor of the product produced.

One of the most revolutionary concepts of the present invention is that various secondary protein sources, including the more economical vegetable proteins may be employed as the sole protein source in the present invention to produce foodstuffs such as meat surrogate products, or alternately may be combined with animal protein materials having their natural flavor components to yield even more economical food products, which still resemble highly desired meat types in texture, but eliminate the need for a flavoring system, as is required when a bland protein source is employed.

Such secondary protein sources may be typically selected from a very broad class of proteinaceous materials capable of being heat set. These include vegetable protein, petro-protein, microbial protein and various secondary protein materials derived from natural meat processing operations, i.e., meat meal, poultry meal, fish meal, and/or various concentrates made therefrom. The vegetable proteins, particularly the oil-seeds, such as soybeans, are among the most usable in the present invention since they are both economical and readily available as a protein source. As to the use of secondary protein sources, it is preferable to first place the source in a purified as well as hydrated form. This can most conveniently be accomplished by precipitation of the protein from a slurry of the secondary protein source. This yields the curd or damp viscous mass form of the protein which may be conveniently utilized as the protein source. Although the following will describe generally the processing of soybeans to yield the hydrated curd, it should be understood that with slight variations involving the isoelectric point of the proteins, the technique can generally be applied to any secondary protein source. It should also be recognized that the curd or hydrated curd or hydrated form of protein can be dried and then also rehydrated without seriously affecting its usefulness as a protein source.

To obtain a protein concentrate or an isolate from a seondary protein source, it is necessary to separate or isolate the protein from nonproteinaceous materials. When producing a protein isolate from an oilseed such as soybeans, for example, a chemical precipitation and separation is usually employed. Typically, whole soybeans are crushed or ground in convenient fashion and passed through a conventional oil expeller. However, the oil is preferably removed by solvent extraction using various hydrocarbon type solvents normally employed for this purpose.

The resulting solids, commonly referred to as soybean meal, and normally in the form of flakes, contain many ingredients including complex proteins, sugars, fibers and others. The proteins and sugars are then preferably dissolved out of the solids. This may be done by adding the flakes to an aqueous bath and adding a food grade alkaline material to raise the pH substantially above 7. Typical of such alkaline materials are sodium hydroxide, potassium hydroxide, calcium hydroxide or other commonly accepted food grade alkaline reagents. The material is then extracted for a period of time sufficient to put the proteins and sugars in solution, usually about 30 minutes or so. The resulting liquor or solution is separated from the solids, as by passing the material through a screen and/or centrifuging. Preferably, the liquor is then cycled through a clarifier to remove tiny particles.

The soy proteins are then precipitated from the liquor by lowering the pH to an acidic value of the isoelectric point of the protein, usually pH of 4.6 to 4.9, with the addition of a common food grade acidic reagent such as acetic acid, phosphoric acid, citric acid, tartaric acid or others. The precipitate is then separated as by centrifuging and washed with water to remove remaining sugars, except for a minute trace of sugars which is almost impossible to remove. The precipitated curd is a viscous aqueous slurry having a solids content of 10-40% by weight, preferably about 20% by weight containing between about 90 and 98% by weight protein on a dry solids basis and between about 60 and 90% by weight water.

The selected protein starting material is initially made into an aqueous slurry by slurrying of the protein material which may be carried out by homogenization or blending. The aqueous slurry of protein material will be formulated to allow for the addition of a sufficient amount of the protein material, or the addition of water or other ingredients to adjust the solids content in the slurry to a level above at least about 5% by weight, but preferably between about 15 and 30% by weight of the slurry. The addition of protein starting material to achieve the prescribed solids level will also be such that the slurry will have a protein content of at least about 5% by weight, but preferably between about 15 and 30% by weight. The higher the proteinaceous solids level of the slurry, the tougher the final product, and the particular solids concentration may also be controlled by this factor as well as the degree of difficulty involved in preparing or feeding a slurry with a higher level of solids in the extruder. The selection of the actual solids content employed will be determined by a balancing of these factors.

Prior to formation of the slurry, various other ingredients will be formulated for addition to the mixture to contribute to the flavor and taste of the food product produced thereby. For example, various smoke or charcoal flavorings, herbs or spices as contribute to the flavor of the product may be added to the mixture at this stage.

There may also be added to the slurry at this stage other ingredients which have been found to additionally contribute to the textural characteristics of the striated food product of the present invention, besides just contributing to and improving the flavor and taste of the food product. Salt, for example, is such an ingredient and is a necessary ingredient for the seasoning and flavoring of a natural meat material. Accordingly, the addition of various salts such as sodium chloride, calcium chloride, or trisodium phosphate improves the flavor and taste characteristics of the product although if above about 3% by weight is added to the mixture in the present process, a very salty taste is attained. It has also been determined, however, that if above about 3% by weight is added to the slurry, not only is the taste of the product too salty, but furthermore, in some instances when the protein starting material is frozen to form segregated ice crystal layers with intermediate layers of protein particles, followed by irreversible fixing of these protein layers, a gel-like or rubbery texture is obtained.

In general, it is preferable that the pH of the proteinaceous slurry be within the range of 4 to 6 to obtain optimum results. However, the process will produce an acceptable product over a very wide and noncritical pH range.

The aqueous slurry of the protein material as formulated will then be slurried prior to freezing. Such slurrying will generally comprise grinding, blending, comminuting or homogenizing of the aqueous slurry of the protein material to in general reduce the protein starting material into samll particles. This also promotes uniform mixing with other ingredients added to the slurry at this stage. Although the exact degree of grinding, comminuting or homogenizing is not critical to the practice of the present invention or the production of the novel food product thereby, the step of grinding or homogenizing may be carried out in various equipment such as a Versator, colloid mill or high speed blending equipment as will produce a uniform and consistent slurry of the protein starting material. In general, the slurry will be uniform and the protein reduced to a small enough particle size that it will resemble a uniform emulsion, for example, if a high percentage of water insoluble material such as fats and oils are employed. Providing for the production of a consistent and uniform slurry promotes the formation of a highly uniform and consistent food product by the present process.

After treatment of the aqueous slurry by homogenization, or other suitable treatment means, the slurry is preferably deaerated by using a vacuum or a piece of equipment such as a Versator which is equipped to perform such a function. While deaeration is not critical to the practice of the novel process; nevertheless, it is preferable in promoting consistency and uniformity of the striated food product of the present invention. The presence of air in the slurry after freezing and heat setting thereof will create voids which will detract from the layers of protein so as to interrupt alignment of the layers. Deaeration, is preferable in the practice of the present invention.

The proteinaceous slurry is then conveyed through a freezing zone in helical fashion, as for example, with an extruder equipped with a rotating screw with the "flights" of the rotating screw being in the form of the helix around the screw. This freezes the slurry and forms ice crystal layers therein which are aligned in a direction which is generally the same as the direction of extrusion. Because, however, the screw is conveying the slurry through the extruder or freezing zone while it is simultaneously being frozen, the ice crystal layers and, hence, the protein layers are arranged in the form of a helix since the flights of the screw force the proteinaceous slurry into contact with the innersurface of the extruder to thereby freeze the slurry in a manner corresponding to the flights of the screw and consequently in the form of a helix. Freezing of the slurry in this manner provides the unexpected advantage of "cross structuring" the protein layers so that a protein food product is formed with a toughened structure.

The unique food product of the present invention is specifically illustrated by FIG. 1. A proteinaceous slurry which has been conveyed through a freezing zone by a rotating screw equipped with flights in a helix-type arrangement has been formed into layers generally arranged in helical fashion. The protein layers 1 are arranged in helical fashion around theoretical axis X which generally corresponds to the direction of extrusion. The layers 1 furthermore are generally aligned in the same direction as the direction of extrusion. The overlap or "cross structuring" of the protein layers is the inherent result of an arrangement of helically aligned striated protein layers aligned generally in the direction of extrusion which provides an additional resistance to a force as would be applied along theoretical axis Y. For purposes of illustration, if one were to unfold the helix arrangement of layers in FIG. 1, the product would have generally parallel striated layers aligned in the direction of extrusion. The helix arrangement creates a "cross structuring" of the protein layers because of an overlap which creates alignment of the layers generally in opposite directions. This additional resistance because of "cross structuring" or overlapping of the protein layers through the formation of these layers into a helix gives the product an inherent toughness or chewiness which a product that does not have the layers arranged in helical fashion would lack. The resultant effect of freezing the protein layers in helical fashion is to provide a "toughening" of the proteinaceous structure which could, of course, be directly correlated with an increased chewiness or toughness of the product since mastication or chewing of the food product would result in a corresponding application of force along theoretical axis Y. Any increase in resistance to a force applied along this theoretical axis would be sensed by an individual as a tougher or more chewy structure.

The present process, furthermore, has the significant advantage of providing a continuous process for freezing of the proteinaceous slurry since the extruder functions as a continuously operated heat exchanger to provide a freezing zone for the formation of ice crystal layers in the slurry. Continuous conveyance of the slurry through the extruder by the rotating screw having the screw "flights" arranged in helical fashion aligns the ice crystal layers generally corresponding to the flights of the screw.

Figure 2:
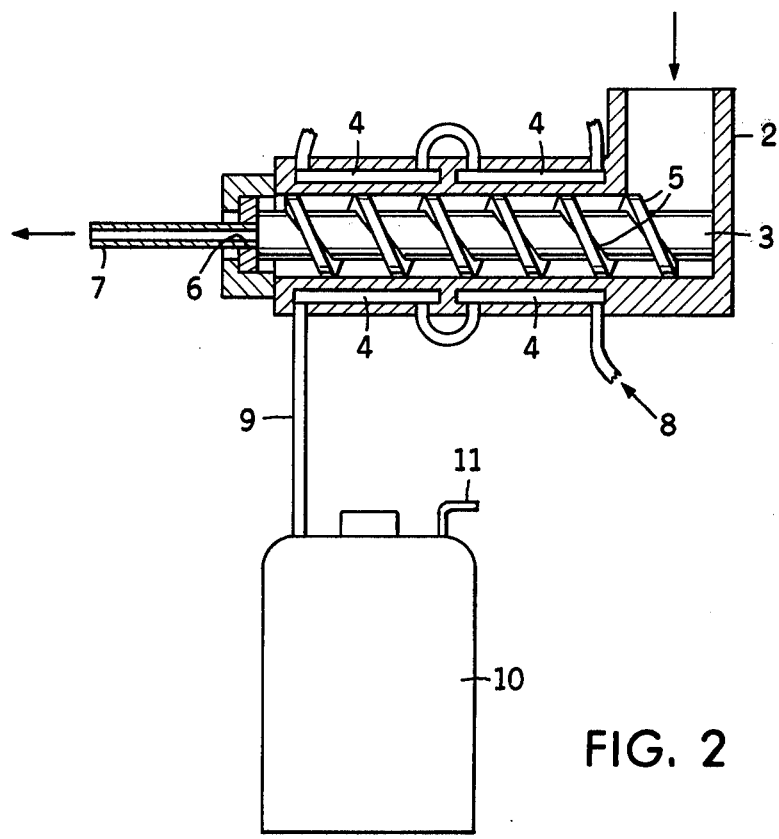
FIG. 2 generally illustrates the apparatus employed to produce the food product having an arrangement of helically aligned protein layers according to the process disclosed herein.

The extruder assembly is specifically illustrated by FIG. 2 in which an extruder equipped for carrying out the process of the present invention is set forth. The extruder 2 comprises a rotating screw 3 having flights 5 arranged in helical fashion around the axis of the screw. The rotating screw is inside the barrel of the extruder with cooling jackets or compartments 4 surrounding both the front and rear portions of the extruder. Orifice 6 is at the point of exit from the extruder body into the die which has an outlet into the atmosphere 7. Although the die is included in the present figure for the purposes of illustration, this may be omitted if desired in the process of the present invention since it does not directly contribute to arrangement of the ice crystal and, hence, the protein layers in helical fashion although it does compact the helix somewhat. The cooling material or refrigerant which reduces the temperature of the extruder barrel to the point of providing a freezing zone is drawn through the jackets 4 of the extruder assembly via a vacuum line 11 which is connected to a collection vessel 10 for collection of the refrigerant which is drawn through the jackets of the extruder. The cooling medium is drawn through the jackets of the extruder at inlet 8 with the jackets 4 being connected for sequential cooling of the extruder. The cooling medium exits the extruder assembly at exit line 9 to sufficiently cool the extruder to the point that it freezes the proteinaceous slurry which is introduced into the extruder assembly and conveyed through the freezing zone created by the rotating screw 3 with the flights 5 in the screw forcing the proteinaceous slurry into direct contact with the barrel of the extruder which freezes the slurry in helical fashion to provide protein layers in the form of a helix generally aligned in the direction of extrusion.

A cooling medium or refrigerant which may be used to convert the extruder to a freezing zone is not critical to the practice of the present invention and may be selected from a wide variety of refrigerants commonly used for this purpose including typical materials such as acetone and ethanol chilled with dry ice, liquid nitrogen, other liquid gases and various types of freons.

The degree of screw rotation or the exact type of screw which may be employed in the extruder apparatus in the present invention is not critical to its practice with the exception that the flights of the screw should be arranged in helical fashion about the screw. The degree of rotation of the screw is not critical to the practice of the present invention with the exception that the dwell time of the proteinaceous slurry in the extruder assembly should be sufficient to freeze the slurry and form ice crystals therein corresponding to the helical flights of the screw.

The proteinaceous slurry which is frozen in the extruder assembly, exits the extruder assembly at orifice 6 and if desired a die 7 can be included as an optional accessory although it should be understood that the use of the die is not critical to the practice of the present invention and a helical arrangement of ice crystal and, hence, protein layers is formed with or without a die which might be included with the extruder assembly. The frozen proteinaceous slurry emerges from the freezing zone or extruder assembly generally in the form of a continuous rope of material which is frozen solid and upon heat setting may be readily observed as having an overlapping or "cross structuring" of the protein layers which is the inherent result of an arrangement of helically aligned protein layers as illustrated by FIG. 1 and provides a product of exceptionally tough and chewy characteristics.

Following formation of the ice crystal layers which mold the protein material of the slurry into layers in the form of a helix, the protein layers must be heat set to convert the same to substantially insoluble form to result in the formation of a food product having the noted arrangement of protein layers. The protein layers may be heat set by raising the temperature of the frozen proteinaceous slurry to a temperature above about 150° F. but preferably above about 180° F. When the proteinaceous slurry is raised to above this temperature rise of the slurry and as the slurry temperature is raised above about 150° F. preferably above about 180° F., fixation of the protein layers occurs.

Heating of the product to carry out irreversible fixation of the protein layers may be carried out in nearly any heating device and at nearly any temperature so long as the temperature in the proteinaceous body achieves the prescribed level. The temperature of the surrounding environment or heating chamber employed, however, should not be so high as to scorch or burn the proteinaceous mass. A convenient means and a specific embodiment of carrying out the heating step therefore is to use a steam chamber fed by live steam and to maintain the chamber at a temperature of at least about 212° F. or to employ a microwave oven to heat set the protein.

The heating step of irreversible fixation of the protein layers must be carried out at a rapid enough rate to achieve a temperature of at least about 150° F. in the mass within a period of time of between about 5 minutes and several hours with the exact rate being dependent on the size of the material. Heating at this rate insures fixation of the temporarily self-supporting protein layers without disruption thereof.

The following Examples will generally serve to be illustrative rather than to limit our invention, since it should be understood that numerous other Examples could be given to illustrate the novel characteristics of the present process.

EXAMPLE 1

Clean, dehulled soybeans are ground and the oil extracted with hexane to get defatted flakes. The flakes are then added to an aqueous bath and a food grade alkaline reagent, calcium hydroxide, added until a pH of about 10 is achieved. The flakes are then extracted for a period of 30 minutes and centrifuged in order to clarify the proteinaceous extract resulting therefrom. The protein material was precipitated from the clarified liquor by adding phosphoric acid until the isoelectric point of the protein was reached at a pH of below about 4.7. The precipitate is then washed with water and centrifuged in order to concentrate the material. The resulting protein isolate "curd" has a solids content of 30% by weight and a protein purity of about 90% by weight on a dry solids basis, with a pH of 4.3.

An extruder is employed as a heat exchanger with the jackets of the extruder being generally connected in sequence to permit continuous cycling of refrigerant through the extruder and provide a suitable freezing zone for freezing of the product. Ethanol chilled with dry ice to below −45° F. is drawn through the jackets of the extruder with a vacuum pump in a manner similar to that described with regard to FIG. 2. A metering screw is used with a compression ratio of 3:1 having a helical arrangement of flights over the length of the screw. A screw speed of approximately 20 rpm is employed and the extruder is run both with and without a ¼ inch die cap placed on the end of the extruder. The proteinaceous slurry is fed into the extruder and slowly run through the extruder while the jackets of the extruder are cooled with the chilled ethanol. As the extruder jacket temperature dropped, the slurry upon exiting from the orifice of the extruder thickened until finally it solidified into a continuous piece. The frozen materials were collected and heat set by placing it in a microwave oven and cooking at a forward power of 7 kilowatts for 6 minutes. Upon heating, the product was observed as having a generally helical configuration with the ice crystal layers aligned generally in the direction of extrusion with a definite cross structuring of the protein layers occurring because of the helical arrangement of the protein layers.

EXAMPLE 2

The protein isolate or curd is generally produced in accordance with Example 1, having a solids content of 27% by weight with a protein purity of about 90% by weight on a dry solids basis. This isolate was used to formulate a proteinaceous slurry consisting of:
1,424 grams of soy protein curd (27% solids)
0.8 grams sodium chloride
75 grams vegetable oil The proteinaceous curd had a pH of about 4.5 and was adjusted to a pH of 5.2 by the addition of 30% sodium hydroxide. The slurry at this point was homogenized and fed into an extruder generally equipped as described in Example 1. The slurry fed easily into the extruder which was very smooth with the product generally in the form of a continuous rope of frozen material. Samples of the frozen product were heat set by cooking in a microwave oven at a forward power of 7 kilowatts for 6 minutes. An examination of the heat set product indicated that the protein layers were aligned generally in the direction of extrusion with cross structuring of the layers occurring because of the helical or spiral nature of the product.

EXAMPLE 3

A proteinaceous slurry having a solids content of 25% by weight was prepared by employing the following percent by weight of ingredients:

| | |
|---|---|
| Soy protein "curd" | 24.15% |
| Water | 72.46% |
| Sodium chloride | .97% |
| Vegetable oil | 2.42% |

The resultant proteinaceous slurry had a pH of 4.9. The slurry was homogenized and deaerated under a vacuum of 29 inches of mercury, followed by division of the slurry into two portions. One portion of the proteinaceous slurry was fed into an extruder generally equipped as described in Example 1 with a ¼ inch square die cap and the temperature of the extruder barrel was generally monitored in the cooling jacket nearest the orifice of the extruder and was determined to be approximately 29° F. The revolutions per minute of the extruder screw were approximately 28. A continuous rope of frozen material exited the extruder which was subsequently saved for heat setting as described below.

The second portion of the proteinaceous slurry was frozen and was placed in a pan having a depth of ¼ inch and frozen to provide a layer of striated protein product generally produced in accordance with U.S. Pat. No. 3,920,853. The two frozen samples were placed in a steam chest maintained at a temperature of about 212° F. at a pressure of 15 psi for 15 minutes. Following heat setting, an examination of the product revealed that the slurry which was not extruded consisted of striated, generally parallel protein layers which were generally normal to contact of the slurry with the refrigerating surface. Examination of the extruded product revealed a helix-like product with the layers generally aligned in the direction of extrusion with the spiral or helix arranged in layers corresponding to the flights of the screw used in extruding the product. Samples of both products were then tested for shear strength using the Instron tester with a multiple blade shear cage. The process for measuring shear in this manner is generally described in *Physical Properties of Plant and Animal Materials* by Gordon and Breach Science Publishers — Chapter 7. Twenty grams of each sample were placed in the cage for each shear test and a full scale load of 1,000 pounds were employed for testing purposes. In this manner the pounds of force per gram of dry weight to shear on both the extruded and nonextruded product were measured. The results obtained are set forth below in Table 1.

TABLE 1

| Sample | Pounds Force/Gram Dry Weight |
|---|---|
| Extruded | 15.90 |
| Not extruded | 7.32 |

It is apparent that the product having the helical arrangement of protein layers required significantly more force to shear the product than was required with the unextruded product. It is, therefore, apparent that a significant improvement in toughness of a structured protein product produced by the general process set out herein has been achieved as evidenced by the above described shear values.

The above Examples are merely illustrative of the instant invention and it will be understood that various other changes in details, materials or steps which have been described may be made without departing from the spirit of the instant disclosure and such changes and other modifications are intended to be included within the scope of the instant disclosure and appended claims.

We claim:

1. A method of preparing a protein food product having an arrangement of helically aligned protein layers comprising:
   a. freezing an aqueous slurry of a protein material having a solids content of at least about 5% by weight by helically conveying said slurry through a freezing zone to form ice crystal layers which mold the protein material of the slurry into layers in the form of a helix, and
   b. heat setting the protein layers into a substantially insoluble form by heating the frozen slurry to a temperature sufficiently high to allow the protein layers to set and lower than a temperature at which the protein will degrade thereby melting the ice crystal layers to form the protein food product.

2. The method of claim 1 wherein said protein material is an animal protein material.

3. The method of claim 1 wherein said protein material is a vegetable protein material.

4. The method of claim 3 wherein said vegetable protein material is a soybean material.

5. The method of claim 1 wherein said protein material is a mixture of an animal protein material and a vegetable protein material.

6. The method of claim 1 wherein said slurry is heat set at a temperature of at least about 150° F.

7. The method of claim 1 wherein said slurry has a solids content of at least about 15% by weight.

8. The method of claim 7 wherein said slurry has a solids content of between about 15–30% by weight.

* * * * *